(12) United States Patent
Umezu et al.

(10) Patent No.: US 7,253,976 B2
(45) Date of Patent: Aug. 7, 2007

(54) OPTICAL APPARATUS

(75) Inventors: Takuji Umezu, Utsunomiya (JP);
Kazuhiro Noguchi, Utsunomiya (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 11/566,524

(22) Filed: Dec. 4, 2006

(65) Prior Publication Data

US 2007/0091478 A1   Apr. 26, 2007

Related U.S. Application Data

(63) Continuation of application No. 11/092,386, filed on Mar. 29, 2005, now Pat. No. 7,154,682.

(30) Foreign Application Priority Data

Mar. 31, 2004   (JP)   .............................. 2004-103225

(51) Int. Cl.
*G02B 7/02* (2006.01)
*G03B 17/00* (2006.01)
*H04N 5/228* (2006.01)

(52) U.S. Cl. .................. 359/824; 359/819; 396/55; 348/208.99

(58) Field of Classification Search ................ 359/554, 359/557, 740, 813, 819, 824; 396/55; 348/208.99
See application file for complete search history.

(56) References Cited

U.S. PATENT DOCUMENTS

| 5,416,558 | A | | 5/1995 | Katayama et al. ............ 396/52 |
| 5,654,826 | A | * | 8/1997 | Suzuki ....................... 359/557 |
| 5,703,730 | A | * | 12/1997 | Yomoda ..................... 359/824 |
| 5,715,479 | A | | 2/1998 | Katayama et al. ............ 396/55 |
| 6,791,772 | B2 | * | 9/2004 | Wakabayashi et al. ...... 359/824 |

* cited by examiner

*Primary Examiner*—M. Hasan
(74) *Attorney, Agent, or Firm*—Canon U.S.A. Inc I.P. Div

(57) ABSTRACT

An optical apparatus includes a light-quantity-adjusting unit, a first lens unit disposed closer to an object than the light-quantity-adjusting unit, a second lens unit disposed closer to an image plane than the light-quantity-adjusting unit, and a drive unit for driving the first lens unit and the second lens unit in an orthogonal-to-optical-axis direction.

1 Claim, 7 Drawing Sheets

OPTICAL APPARATUS

The application is a continuation of U.S. patent application Ser. No. 11/092,386 filed Mar. 29, 2005, now U.S. Pat. No. 7,154,682, which claims the benefit of Japanese Application 2004-103225 filed Mar. 31, 2004, both of which are incorporated by reference herein in their entirety.

BACKGROUND OF THE INVENTION

1. Field of the Invention

The present invention relates to optical apparatuses, such as image-capturing apparatuses including camcorders and digital still cameras, and interchangeable lens systems.

2. Description of the Related Art

Image-capturing apparatuses and interchangeable lens systems often include a blur-compensating device for moving a lens in a direction substantially orthogonal to the optical axis (hereinafter, referred to as "orthogonal-to-optical-axis direction") to bend the optical axis of the image-capturing optical system, thereby compensating for image blur caused by hand movement or the like. Generally, in such a blur-compensating device, a lens unit closer to the image plane (hereinafter referred to as "compensating lens unit") than a light-quantity-adjusting unit is driven in the orthogonal-to-optical-axis direction (see Patent Document 1: Japanese Patent Laid-Open No. 7-36074, corresponding to U.S. Pat. No. 5,715,479). On the other hand, a lens unit closer to an object (hereinafter referred to as "variator") than the light-quantity adjusting unit is immovable in the orthogonal-to-optical-axis direction, and the distance between the variator and the compensating lens unit, along the optical axis, is fixed.

However, when only the compensating lens unit is driven in the orthogonal-to-optical-axis direction, the freedom of optical design or the freedom of mechanical design, which involves the drive mechanisms of the light-quantity-adjusting unit and compensating lens unit, are limited. This may become an obstacle to the downsizing of optical apparatuses.

Moreover, for example, in a zoom-lens system in which the variator is moved along the optical axis for zooming in and out, when only the compensating lens unit is driven in the orthogonal-to-optical-axis direction, the variator cannot be brought close to the compensating lens unit because the light-quantity-adjusting unit is interposed therebetween. It is thus difficult to improve the zoom efficiency in the zoom-lens system.

SUMMARY OF THE INVENTION

The present invention is directed to an optical apparatus that provides the structure of a blur-compensating optical system that can contribute to the reduced size of the optical apparatus, and further to improved zoom efficiency when used in a zoom-lens system.

In one aspect of the present invention, an optical apparatus includes a light-quantity-adjusting unit; a first lens unit disposed closer to an object than the light-quantity-adjusting unit; a second lens unit disposed closer to an image plane than the light-quantity-adjusting unit; and a drive unit driving the first lens unit and the second lens unit in an orthogonal-to-optical-axis direction.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

The embodiments of the present invention will now be described with reference to the drawings.

Figure 1:
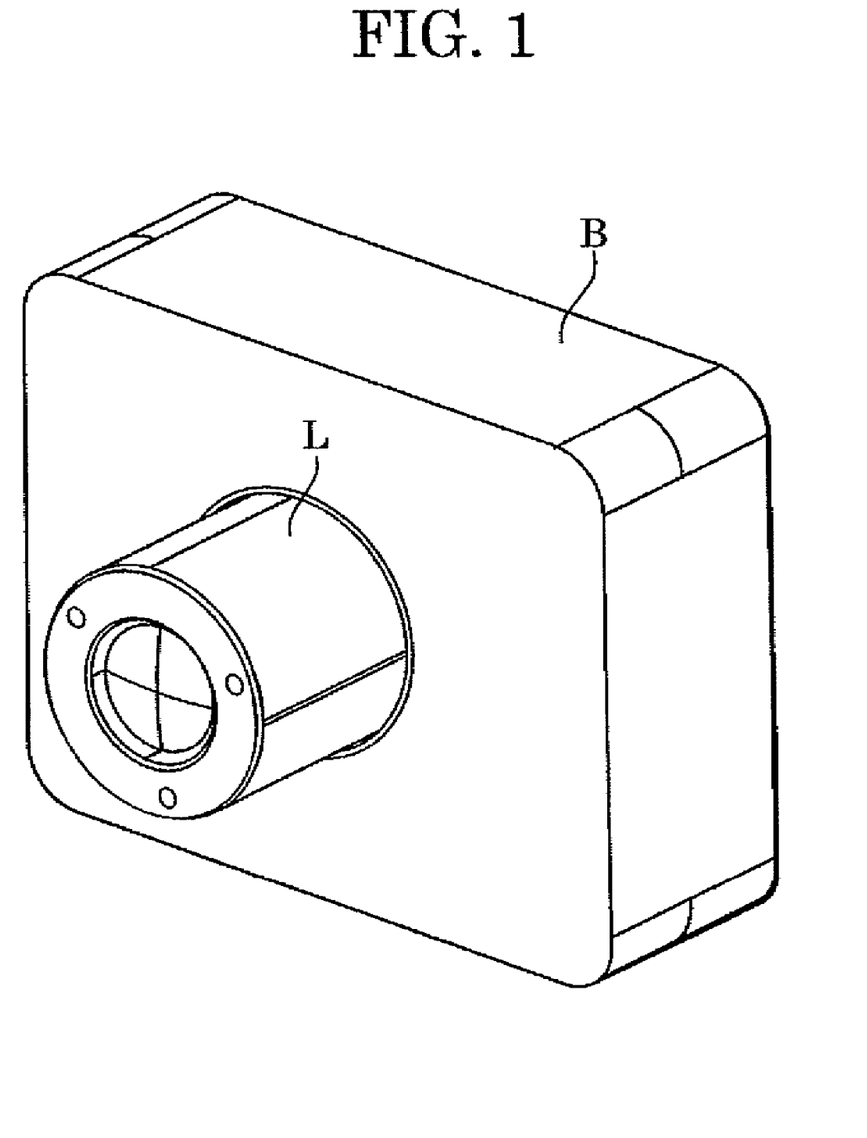
FIG. 1 is a perspective view of a camera according to an embodiment of the present invention.

FIG. 1 shows the structure of an image-capturing apparatus (hereinafter referred to as "camera"), such as a camcorder and a digital camera, according to an embodiment of the present invention. Referring to FIG. 1, the camera includes a lens barrel L with zooming capabilities and a camera body B. The camera body B includes a silver-salt film or an image-capturing device for recording a subject image formed by an image-capturing optical system in the lens barrel L.

Figure 2:
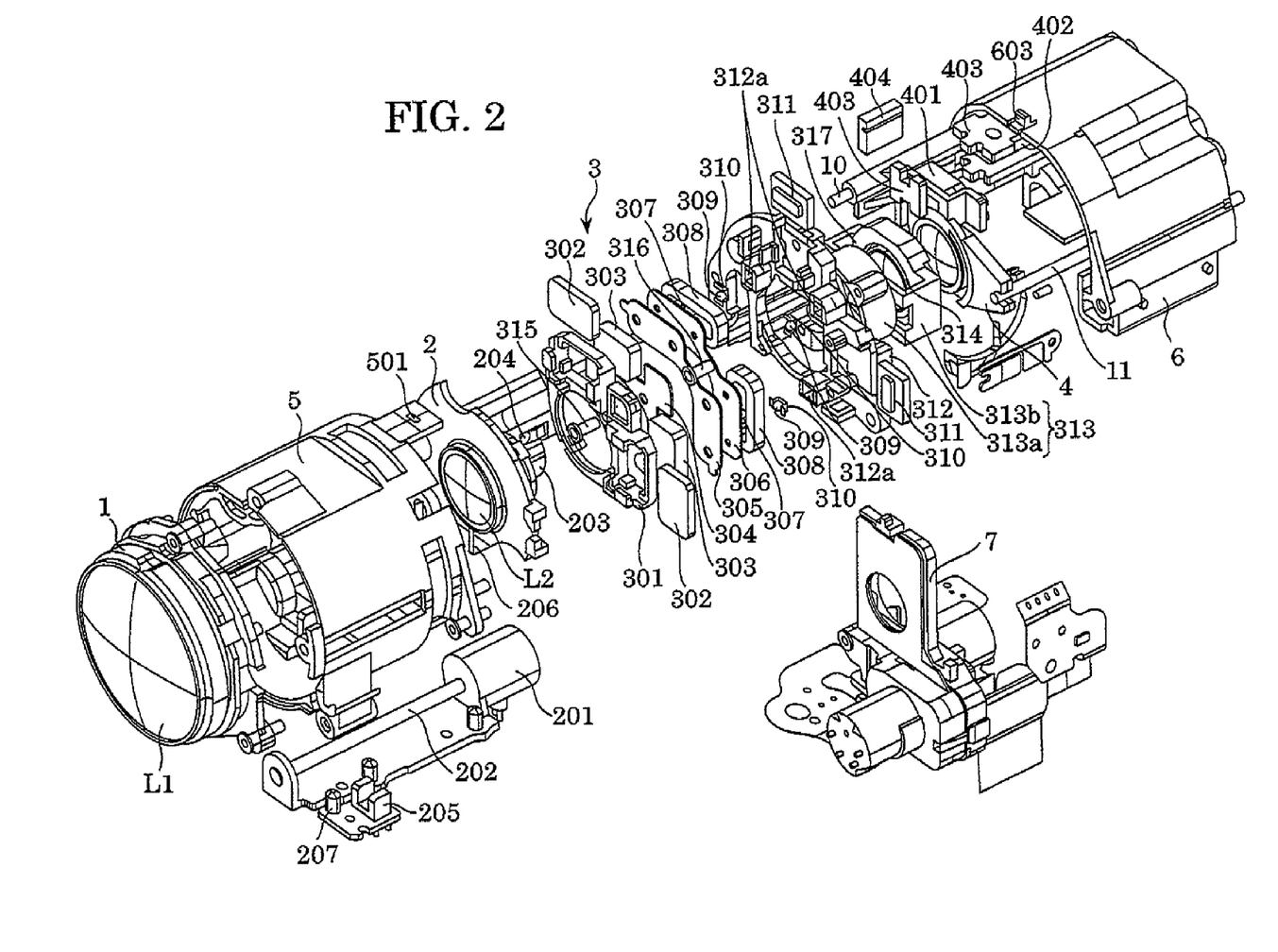
FIG. 2 is an exploded perspective view of a lens barrel included in the camera shown in FIG. 1.
Figure 3:
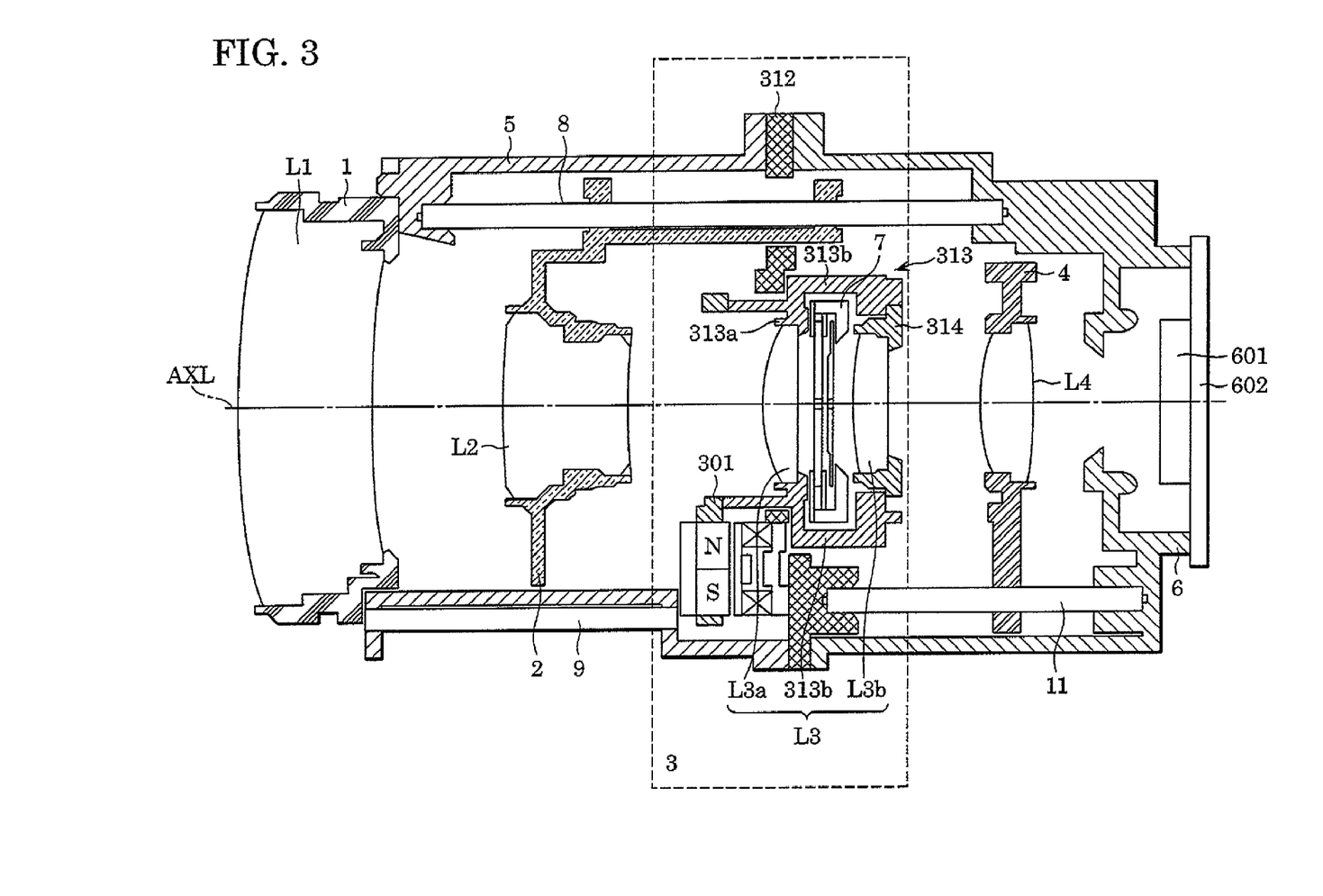
FIG. 3 is a cross-sectional view of the lens barrel shown in FIG. 2.
Figure 4:
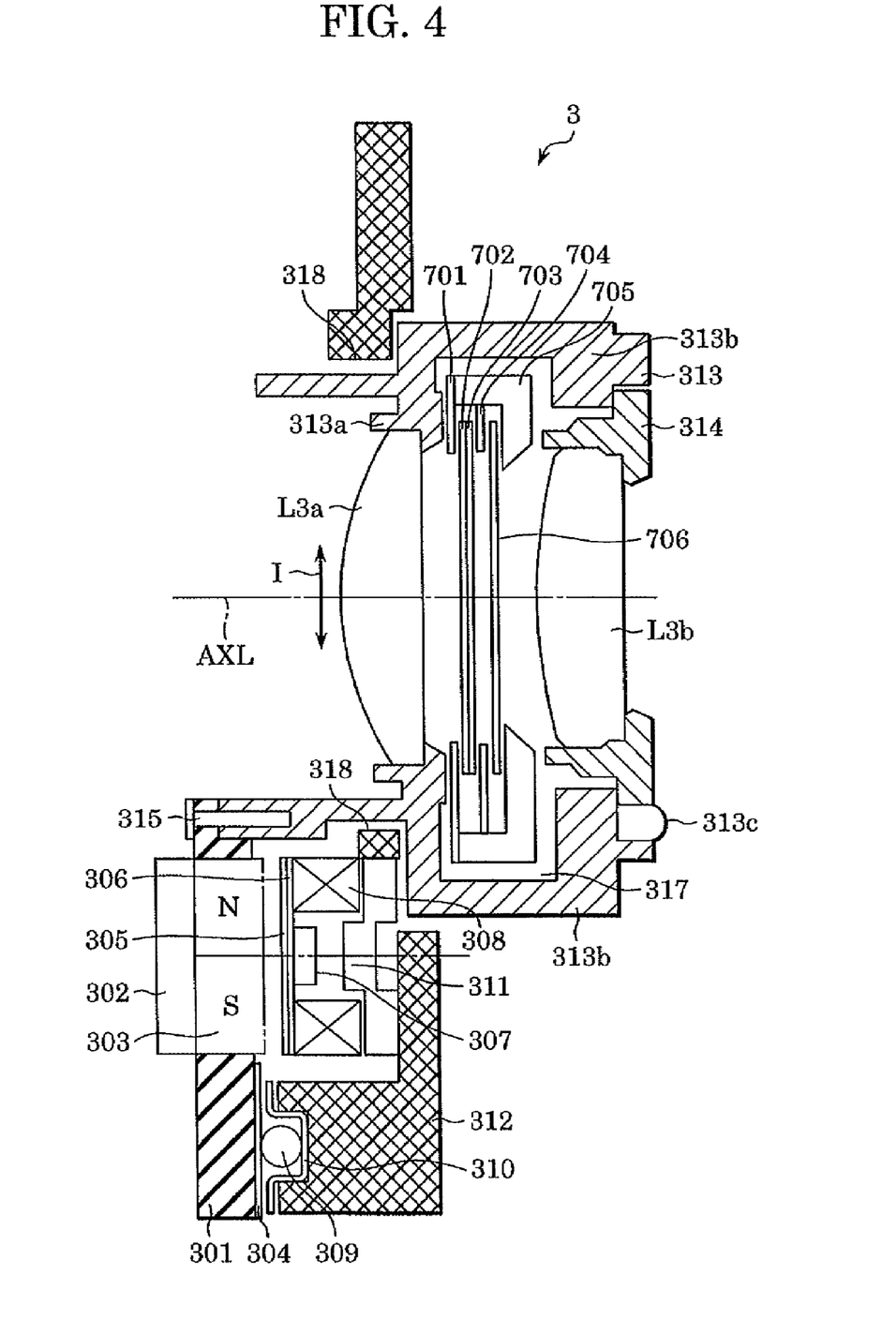
FIG. 4 is a cross-sectional view of a shift unit included in the lens barrel shown in FIG. 2.

FIGS. 2 and 3 show the structure of the lens barrel L shown in FIG. 1. The image-capturing optical system is a zoom optical system (zoom lens system) including four lens units, that is, convex, concave, convex, and convex lens units, starting from the object side (from the left in each drawing). FIG. 4 is a cross-sectional view of a shift unit 3 serving as a blur-compensating device included in the lens barrel L.

Referring to these drawings, the lens barrel L includes a first lens unit L1, a second lens unit L2 for zooming in and out by moving along the optical axis AXL (see FIG. 3), and a third lens unit L3 for compensating for image blur by moving in a plane substantially orthogonal to the optical axis (hereinafter referred to as "orthogonal-to-optical-axis plane"), that is, by moving in a direction substantially orthogonal to the optical axis (hereinafter referred to as "orthogonal-to-optical-axis direction"). The third lens unit L3 includes a third-a lens subunit L3a (corresponding to the first lens unit in the first aspect of the present invention) and a third-b lens subunit L3b (corresponding to the second lens unit in the first aspect of the present invention) located closer to the image plane than the third-a lens subunit L3a. The lens barrel L further includes a fourth lens unit L4 for focusing by moving along the optical axis.

A front lens barrel 1 holds the first lens unit L1. To secure the first lens unit L1 in place, the rear end of a fixed barrel 5 is joined to a shift base 312, which serves as a base member for a shift unit 3, while the front end of the fixed barrel 5 is joined to the front lens barrel 1.

A variator moving frame 2 holds the second lens unit L2. The shift unit 3 combines the third-a lens subunit L3a and the third-b lens subunit L3b in an integrated fashion and moves them in an orthogonal-to-optical-axis direction. A focus moving frame 4 holds the fourth lens unit L4. A rear barrel 6 holds an image-capturing device (photoelectric transducer) 601, such as a charge-coupled device (CCD) sensor and a complementary metal-oxide semiconductor (CMOS) sensor. The rear barrel 6 is joined to the shift base 312 at the front end.

An intermediate member 602 is provided for attaching the image-capturing device 601 to the rear barrel 6. After securing the image-capturing device 601 to the intermediate member 602 with an adhesive or the like, the intermediate member 602 is fastened to the rear barrel 6 with screws.

A first guide bar 8 is held by the fixed barrel 5 and the rear barrel 6 at both ends. A second guide bar 9 is pressed into and held by the fixed barrel 5. A third guide bar 10 and a fourth guide bar 11 are held by the shift base 312 and the rear barrel 6.

The variator moving frame 2 is supported by the first guide bar 8 and second guide bar 9 movably along the optical axis. The focus moving frame 4 is supported by the third guide bar 10 and fourth guide bar 11 movably along the optical axis.

After being positioned with respect to the fixed barrel 5, the shift unit 3 (shift base 312) is placed between the rear barrel 6 and the fixed barrel 5 and joined to them.

A light-quantity-adjusting unit 7 adjusts the amount of light entering the image-capturing optical system. The light-quantity-adjusting unit 7 moves two iris blades 702 and 703 in an orthogonal-to-optical-axis direction to change the aperture diameter. A neutral density filter (ND filter) 706 for two densities is capable of moving forward and backward with respect to the optical path, independent of the iris blades 702 and 703. The light-quantity-adjusting unit 7 is fastened to the shift base 312 with screws.

The rear barrel 6 is positioned with respect to the fixed barrel 5 and fastened with screws from the back, with the shift base 312 interposed between the fixed barrel 5 and the rear barrel 6, as described above. At the same time, an engaging projection 603 provided at the upper front end of the rear barrel 6 is moved into engagement with an engaging hole 501 provided at the upper rear end of the fixed barrel 5.

A focus motor (voice coil motor) for driving the fourth lens unit L4 along the optical axis includes a coil 401, a drive magnet 402, and a yoke member 403 for closing a magnetic flux. The application of current to the coil 401 causes a Lorentz force to be generated, because magnetic lines of force generated between the drive magnet 402 and the coil 401 repel one another. The Lorentz force then drives the focus moving frame 4 and the fourth lens unit L4 along the optical axis. The focus moving frame 4 holds a multipolar sensor magnet (not shown) magnetized in the optical-axis direction. The fixed barrel 5 is provided with a magnetoresistive (MR) sensor 404 fastened, with screws, to the point opposite the sensor magnet of the focus moving frame 4. The MR sensor 404 is capable of detecting variations in magnetic lines of force associated with the movement of the sensor magnet. Using signals from the MR sensor 404, the amount of travel of the focus moving frame 4, that is, the fourth lens unit L4, from a predetermined reference position can be detected.

A stepping motor 201 (corresponding to "zoom motor 33" in FIG. 7) drives the second lens unit L2 along the optical axis. The output shaft of the stepping motor 201 is provided with a lead screw 202. The stepping motor 201 is fastened through a supporting member to the fixed barrel 5 with screws. A rack 203 attached to the variator moving frame 2 engages with the lead screw 202. The application of current to the stepping motor 201 causes the lead screw 202 to rotate, thereby driving the second lens unit L2 along the optical axis.

The biasing force of a torsion coil spring 204 prevents the rack 203, the variator moving frame 2, the first and second guide bars 8 and 9, and the lead screw 202 from rattling against one another.

Figure 7:
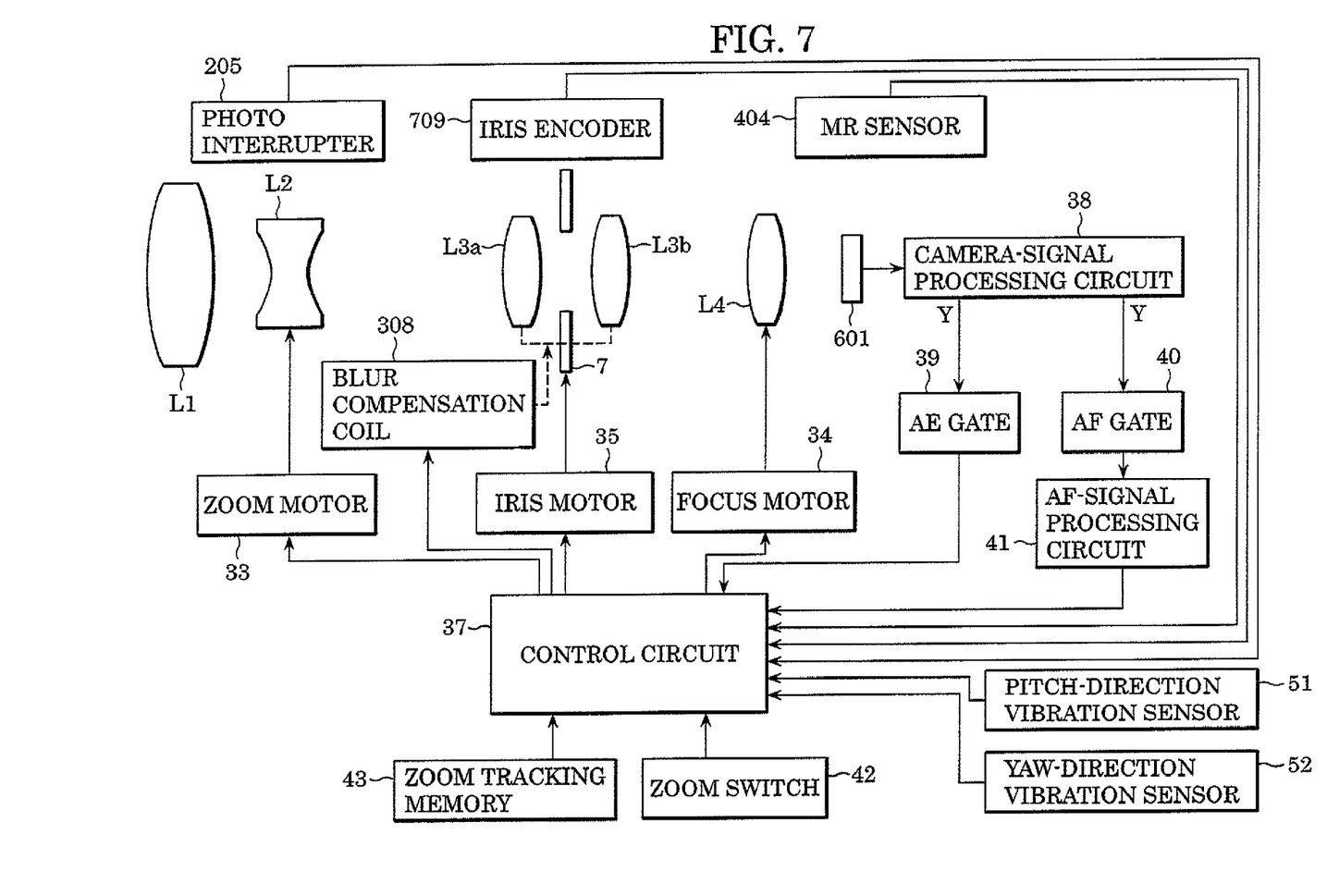
FIG. 7 is a block diagram showing the structure of an electric circuit of the camera shown in FIG. 1.

A photo interrupter 205, as shown in FIG. 7, serves as a zoom-reset switch for detecting a reference position of the variator moving frame 2. The photo interrupter 205 detects the switching between a light-blocking mode and a light-transmitting mode, caused by the movement of a light shield 206 arranged in the variator moving frame 2. The photo interrupter 205 is fastened to the fixed barrel 5, with a substrate interposed therebetween, with a screw 207.

The structure of the shift unit 3 and light-quantity-adjusting unit 7 will now be described in detail. In the shift unit 3, the third-a lens subunit L3a and the third-b lens subunit L3b are driven, on their corresponding orthogonal-to-optical-axis planes, by a pitch actuator for compensating for image blur caused by angular variations in the vertical direction (pitch direction) of the camera; and by a yaw actuator for compensating for image blur caused by angular variations in the horizontal direction (yaw direction) of the camera.

The camera body B includes, as shown in FIG. 7, a vibration sensor 51 and a vibration sensor 52, such as vibration gyro sensors, for detecting angular variations in the pitch direction and the yaw direction. A control circuit 37, such as a CPU for executing the entire control of the camera, controls each actuator based on the output from the vibration sensors 51 and 52, and signals from a position sensor (described below) detecting the position of the third-a lens subunit L3a and the third-b lens subunit L3b on their corresponding orthogonal-to-optical-axis planes. Each drive operation of the pitch actuator and yaw actuator is independently controlled.

The actuator and position sensor for the pitch direction are arranged to be orthogonal to the actuator and position sensor for the yaw direction. Only the structure for the yaw direction (shown in FIG. 2 and the cross-sectional view in FIG. 4) will be described below, as the structures for both directions are the same.

A first shift barrel 313 holds the third-a lens subunit L3a, while a second shift barrel 314 (corresponding to the second holder in the first aspect of the present invention) holds the third-b lens subunit L3b. The first shift barrel 313 includes a lens holder 313a (corresponding to the first holder in the third aspect of the present invention) for holding the third-a lens subunit L3a, and a connector 313b for connecting the lens holder 313a and the second shift barrel 314. To ensure the strength of connection, the connector 313b extends to both ends of the lens holder 313a (corresponding to the two points along the first orthogonal-to-optical-axis direction in the third aspect of the present invention). The first shift barrel 313 and the second shift barrel 314 are bonded together with an adhesive 313c, after the adjustment to align the optical axes of the third-a lens subunit L3a and the third-b lens subunit L3b in order to remove the relative eccentricity between the first shift barrel 313 and the second shift barrel 314.

Since the first shift barrel 313 (connector 313b) and the second shift barrel 314 are bonded together, the distance between the third-a lens subunit L3a and the third-b lens subunit L3b, along the optical axis, is kept constant (fixed). In practice, the third-a lens subunit L3a and the third-b lens subunit L3b move together to bend the optical axis AXL for image-blur compensation.

A magnet 303 providing both a driving purpose and a position-detecting purpose is pressed into and held by a magnet base 301. Since the magnet 303 is pressed and fitted into the magnet base 301, the positional relationship between the magnet 303 and the magnet base 301 is maintained. Since the magnet base 301 is fastened with a screw 315 to the first shift barrel 313 to which the second shift barrel 314 has already been bonded, the magnet 303 can be positioned at a fixed point with respect to the third-a lens subunit L3a and the third-b lens subunit L3b. As such, the magnet 303 can accurately detect the positions of the third-a lens subunit L3a and the third-b lens subunit L3b.

The magnet base 301 is secured, with the screw 315, to the first shift barrel 313 with a metal plate 304 interposed therebetween. Stainless steel or the like is suited as a material for the metal plate 304.

Three balls 309 on an orthogonal-to-optical-axis plane are interposed between the shift base 312 and the magnet base 301, and are arranged around the optical axis. The metal plate 304 described above is disposed between the balls 309 and the magnet base 301. Even if the camera receives a shock, the metal plate 304 prevents the balls 309 from causing dents on the molded magnet base 301, thereby preventing the drive performance of the shift unit 3 from being degraded. Substantially u-shaped ball holders 310 made of stainless steel or the like are disposed between the balls 309 and the shift base 312. The ball holders 310 are pressed into holes 312a (see FIG. 2) provided in the shift base 312 and hold the corresponding balls 309 rotatably therein.

The balls 309 can be made of stainless steel or the like, so as not to be attracted to the magnet 303 disposed in the vicinity thereof.

It is the force of attraction between the magnet 303 and a rear yoke 311 that allows the balls 309 to be reliably in contact with the shift base 312 (end surfaces of the ball holders 310 orthogonal to the optical axis) and with the magnet base 301 (metal plate 304). This force of attraction causes the magnet base 301 to be biased toward the shift base 312, thereby pressing the three balls 309 into contact with the above-described end surfaces of the ball holders 310, and with three points on the metal plate 304. The surfaces with which the three balls 309 are in contact extend in the direction orthogonal to the optical axis AXL of the image-capturing optical system. The three balls 309 have the same nominal diameter. Therefore, it is possible to move the third lens unit L3 in the orthogonal-to-optical-axis plane without causing it to lean towards the optical axis, by minimizing the amount of displacement, along the optical axis, between the end surfaces of the three ball holders 310, and by minimizing the amount of displacement, along the optical axis, between the above-described three points on the metal plate 304.

Thus, the force of attraction between the magnet 303 and the rear yoke 311 for biasing the magnet base 301 towards the shift base 312 eliminates the need for parts for biasing, such as springs, and can reduce the size of the shift unit 3.

Actuators for driving the magnet base 301 and the third lens unit L3 will now be described. As described above, the magnet 303 is magnetized and polarized radially from the optical axis AXL, as shown in FIG. 3. A front yoke 302 is provided for closing the magnetic flux, along the optical axis, in front of the magnet 303. The front yoke 302 is attracted and secured to the magnet 303. A coil 308 is bonded to the shift base 312. The rear yoke 311 is provided for closing the magnetic flux, along the optical axis, behind the magnet 303. The rear yoke 311 is arranged opposite the magnet 303 with the coil 308 interposed therebetween, and is held by the shift base 312. The magnet 303, the front yoke 302, the rear yoke 311, and the coil 308 constitute a magnetic circuit.

When a current is applied to the coil 308, magnetic lines of force generated between the magnet 303 and coil 308. repel one another in the direction substantially orthogonal to the magnetic boundary of the magnet 303, and cause a Lorentz force, which moves the magnet base 301 in the orthogonal-to-optical-axis direction. This is a so-called moving-magnet-type actuator.

Since actuators with such a structure are provided at respective vertical and horizontal directions, it is possible to drive the magnet base 301 and the third lens unit L3 in two orthogonal-to-optical-axis directions intersecting at substantially right angles. The combination of the vertical and horizontal driving thus allows the magnet base 301 and third lens unit L3 to move freely within a predetermined area on the orthogonal-to-optical-axis plane.

Friction on the movement of the magnet base 301 in the orthogonal-to-optical-axis direction is only rolling friction between the balls 309 and the metal plate 304, and between the balls 309 and the ball holders 310. Therefore, despite the force of attraction acting as described above, the magnet base 301 (that is, the third lens unit L3) can move extremely smooth, and fine control over the amount of travel can be made. The application of lubricating oil to the balls 309 allows for a further reduction in friction.

Position detection of the magnet base 301 and third lens unit L3 will now be described. A hall element 307 for converting a magnetic flux density into electric signals is soldered to a flexible print cable (hereinafter referred to as FPC) 306. The FPC 306 is positioned with respect to the shift base 312 and secured. Securing an FPC retainer 305 with a screw 316 to the shift base 312 prevents the loosening of the FPC 306 and the positional displacement of the hall element 307. A position sensor for detecting the position of the magnet base 301 and third lens unit L3 is thus provided.

When the magnet base 301 and the third lens unit L3 are driven vertically or horizontally, the hall element 307 detects changes in magnetic flux density and outputs electric signals indicating the changes therefrom. Based on the electric signals from the hall element 307, the control circuit 37 can detect the position of the magnet base 301 and the third lens unit L3. The magnet 303 not only serves as a magnet for driving, but also serves as a magnet for position detection.

Figure 5:
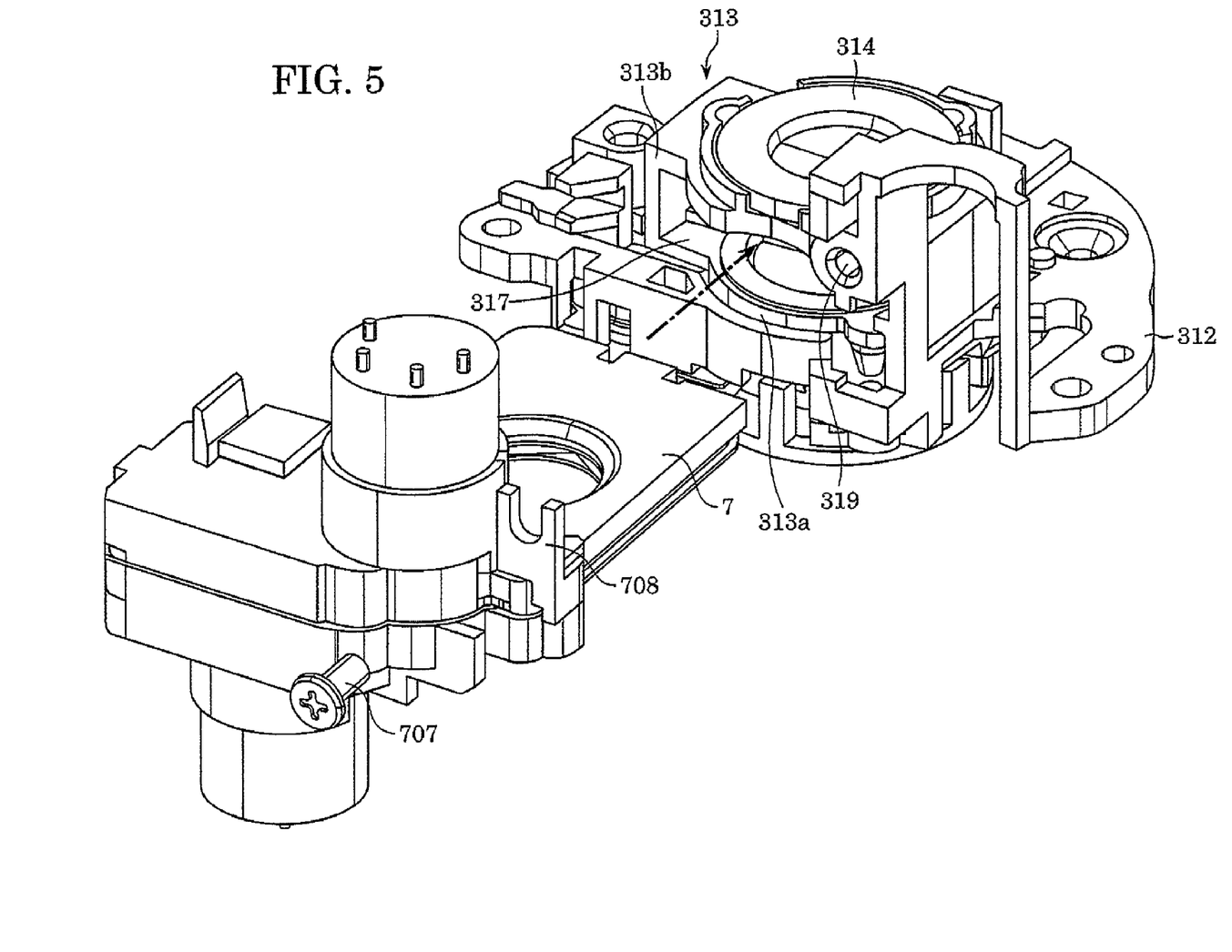
FIG. 5 is a perspective view for illustrating a method for integrating a light-quantity-adjusting unit with the shift unit shown in FIG. 4.

The relationship between the shift unit 3 and the light-quantity-adjusting unit 7 will now be described with reference to the drawings including FIG. 5. In the vicinity of the optical axis, the light-quantity-adjusting unit 7 has the thickness formed by a retaining plate 701, the iris blade 702, the iris blade 703, a partition plate 704, an iris bottom board 705, and the ND filter 706 that are layered along the optical axis. A prepared hole 319 for a self-tap screw is provided in the shift base 312. A mounting base 708 is to be interposed between a screw 707 and the shift base 312. The above-described thickness part, which is from the retaining plate 701 to the ND filter 706, is inserted, from the direction orthogonal to the line connecting both ends of the connector 313b (corresponding to the second orthogonal-to-optical-axis direction in the third aspect of the present invention), into a space 317 defined by the lens holder 313a in the first shift barrel 313, the second shift barrel 314, and the connector 313b at both sides. After the insertion, the light-quantity-adjusting unit 7 is secured to the shift base 312, at the mounting base 708, with the screw 707. The thickness part is thus interposed between the third-a lens subunit L3a and the third-b lens subunit L3b.

Figure 6:
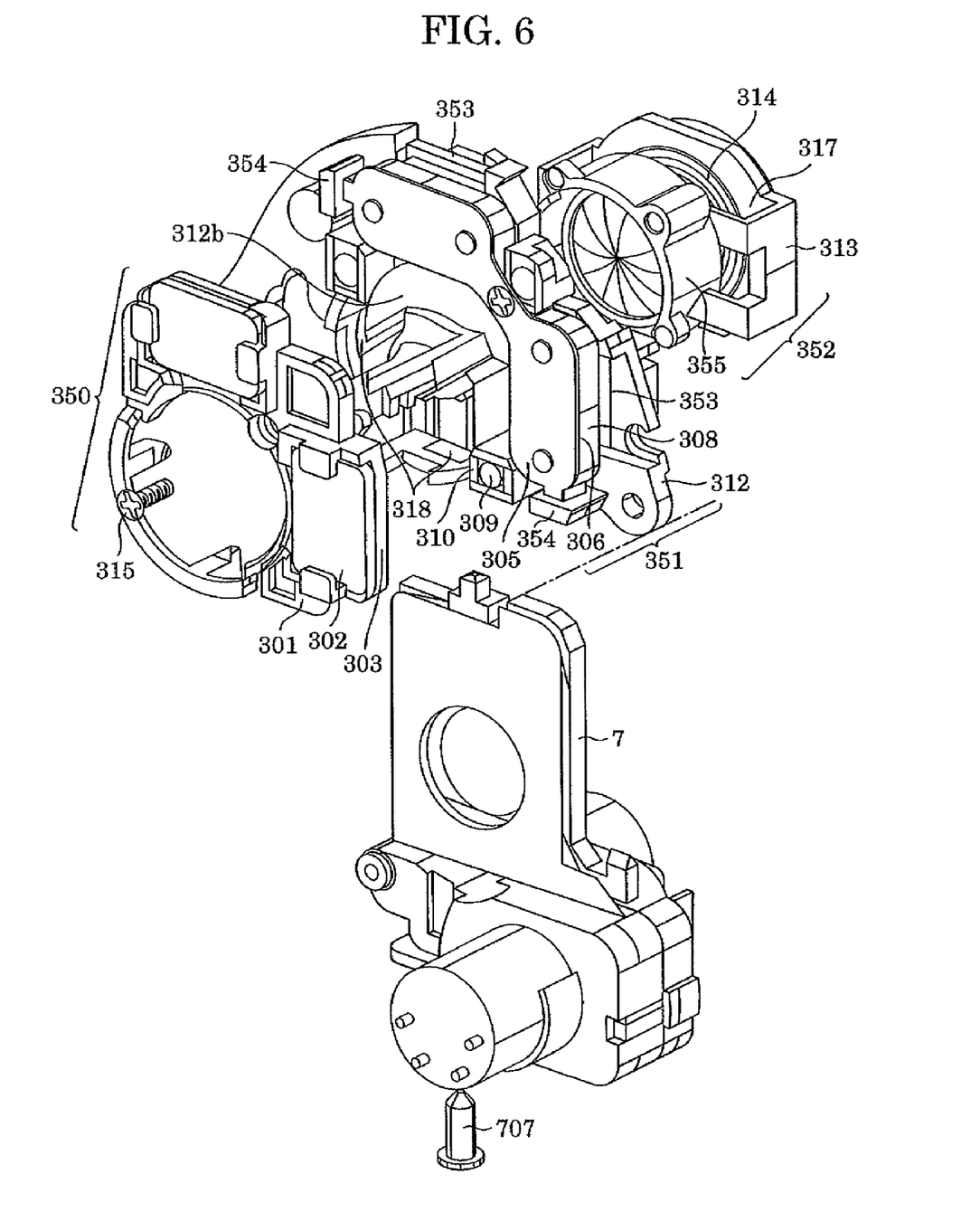
FIG. 6 is a perspective view for illustrating the assembling procedure for the shift unit shown in FIG. 4.

The assembling procedure of the shift unit 3 and the light-quantity-adjusting unit 7 will now be described with reference to FIG. 6. The shift unit 3 of the present embodiment includes a shift magnet unit 350, a coil unit 351, and a shift-moving-frame unit 352. The shift magnet unit 350 mainly includes the magnet 303 and the front yoke 302. The coil unit 351 mainly includes the coil 308, the hall element 307, and the rear yoke 311. The shift-moving-frame unit 352 mainly includes the third-a lens subunit L3a, the third-b lens subunit L3b, the first shift barrel 313, and the second shift barrel 314.

In the shift magnet unit 350, the magnet 303 is first pressed into the magnet base 301. Then, the front yoke 302 is slid and pressed, in the orthogonal-to-optical-axis direction, into the magnet base 301.

In the coil unit 351, the rear yoke 311 is first slid and pressed, in the orthogonal-to-optical-axis direction, into the shift base 312. An adhesive may be applied to a boundary 353 between the rear yoke 311 and the shift base 312 to more firmly secure the rear yoke 311 to the shift base 312. The coil 308 is fitted in the shift base 312 along the optical axis. The FPC 306 to which the hall element 307 has already been soldered is placed on the coil 308. Then, the FPC retainer 305 is placed on a hook 354, and fastened with the screw 316 to the shift base 312 to retain the coil 308 and the FPC 306.

The first shift barrel 313 crimping the third-a lens subunit L3a, and the second shift barrel 314 crimping the third-b lens subunit L3b are bonded with the adhesive 313c, as described above, to form the shift-moving-frame unit 352.

After the ball holders 310 and the balls 309 are placed on the coil unit 351, the connector 313b of the shift-moving-frame unit 352 and shift magnet unit 350 are assembled, with the coil unit 351 and the shift base 312 being partially interposed therebetween, to form the shift unit 3. At the same time, a flange 355 for the first shift barrel 313 and a prepared screw hole are fitted into an opening 312b of the shift base 312 to pass through, along the optical axis, to reach the front. Then, in front of the shift base 312, the flange 355 and the prepared screw hole are secured, with the screw 315, to the magnet base 301 in the shift magnet unit 350.

As described above, the shift-moving-frame unit 352 and the shift magnet unit 350 are assembled together, with the coil unit 351 and the shift base 312 being partially interposed therebetween, and secured. Therefore, even if a shock exceeding the force of attraction between the magnet 303 and the rear yoke 311 is applied to the front of the camera, the connector 313b in the shift-moving-frame unit 352 is brought into contact with a part of the coil unit 351 or the shift base 312, and serves as a stopper. Moreover, even if such a shock is applied to the back of the camera, the balls 309 serve as a stopper to prevent the shift-moving-frame unit 352 from falling from the shift unit 3 and being disabled.

Since the connector 313b to integrate the third-a lens subunit L3a and the third-b lens subunit L3b is used as a stopper, no additional stopper other than the connector 313b is required. This can simplify the structure of the shift unit 3, and can contribute to the size reduction of the lens barrel.

The shift magnet unit 350 and the coil unit 351 are arranged in front of the connector 313b, along the optical axis, and are arranged closer to the optical axis AXL than the connector 313b. In the present embodiment, the space around the third lens unit L3 is reduced by the addition of the connector 313b. However, the above-described arrangement allows the shift magnet unit 350 and the coil unit 351 to be placed without increasing the diameter of the lens barrel.

After the completion of the shift unit 3, the light-quantity-adjusting unit 7 is inserted into the space 317 in the shift-moving-frame unit 352 and fastened to the shift base 312 with the screw 707. Since, as described above, the light-quantity-adjusting unit 7 is inserted into and fastened to the shift-moving-frame unit 352 with the screw 707 later on, performance evaluations on the shift unit 3 can be separately and thus easily performed before installing the light-quantity-adjusting unit 7. The installation of the light-quantity-adjusting unit 7 itself is also easy.

A method for determining the center position of the third lens unit L3 will now be described with reference to FIGS. 4 and 6. Walls 318 provided on the inner side of the opening 312b in the shift base 312 serve as references for the alignment of the optical axis. The distance from the optical axis to each wall 318 is designed to be equal. Although only two walls 318 are shown in the horizontal cross-sectional view in FIG. 4, there are another two walls 318 vertically arranged. That is, a total of four walls 318 are provided.

First, a movable part including the shift-moving-frame unit 352 and the shift magnet unit 350 is moved in an I direction shown in FIG. 4, which is an orthogonal-to-optical-axis direction, and in the direction orthogonal to the I direction, so as to strike the walls 318 and read the output from the hall element 307 at each point struck by the movable part. A position corresponding to the center of the output read from the hall element 307 (hereinafter referred to as "center position") is the position in which the optical axis of the third lens unit L3 is aligned with the optical axis AXL of the image-compensating optical system. This position is stored in a memory included in the camera body B. When no image blur occurs in the camera, the application of current to the coil 308 is controlled such that the movable part is held in the center position.

The shift base 312 contributes to the reduction in the number of parts since, as described above, it not only provides the walls 318 for determining the center position for the movable part, but also serves as a holding member for holding the coil 308 and the rear yoke 311.

FIG. 7 shows the electrical structure of the camera according to the present embodiment. The lens barrel components that are the same as those described in FIGS. 1 to 6 are denoted by the same reference numerals.

The zoom motor 33 corresponds to the stepping motor 201 serving as a drive source for the second lens unit L2. A focus motor (voice coil motor) 34 corresponds to the coil 401 serving as a drive source for the fourth lens unit L4.

An iris motor 35, such as a stepping motor, serves as a drive source for the light-quantity-adjusting unit 7.

The photo interrupter 205 is a zoom-reset switch for detecting whether or not the second lens unit L2 is located at a reference position in the optical-axis direction. After detecting that the second lens unit L2 is located at the reference position, the photo interrupter 205 can detect the amount of travel (position with respect to the reference position) of the second lens unit L2, along the optical axis, by continuously counting the number of pulse signals inputted into the stepping motor 201.

An iris encoder 709 is provided, for example, for a hall element arranged in the iris motor 35 to detect the positional relationship between a rotor and a stator.

The control circuit 37, such as a CPU, executes the control of the camera. A camera-signal processing circuit 38 applies predetermined signal processing, such as amplification and gamma correction, to the output from the image-capturing device 601. Then, contrast signals for the processed image signals are supplied to an autoexposure (AE) gate 39 and to an autofocus (AF) gate 40. The AE gate 39 and the AF gate 40 set the ranges of signal extraction most appropriate for exposure control and focusing, respectively, based on image signals in the entire image area. Each gate may be variable in size, and a plurality of gates may be provided.

An AF-signal processing circuit 41 processes AF signals for autofocus, and generates one or a plurality of outputs for high-frequency components of image signals.

For zooming in and out, a zoom-tracking memory 43 stores positional information of a focusing lens (fourth lens unit L4) based on the camera-subject distance and the position of a variator (second lens unit L2). Alternatively, a memory in the control circuit 37 may be used as a zoom-tracking memory.

For example, when a user manipulates a zoom switch 42, the control circuit 37 controls the drive operation of the zoom motor 33 and the focus motor 34 such that a predetermined positional relationship, determined based on the information stored in the zoom-tracking memory 43, between the second lens unit L2 and the fourth lens unit L4 can be maintained. Specifically, the control circuit 37 controls the drive operation of the zoom motor 33 and the focus motor 34 such that a count value indicating the current absolute position of the second lens unit L2, along the optical axis, matches a determined position at which the second lens unit L2 should be set. At the same time, a count value indicating the current absolute position of the fourth lens unit L4, along the optical axis, matches a determined position at which the fourth lens unit L4 should be set.

In autofocus operation, the control circuit 37 controls the drive operation of the focus motor 34 such that the output of the AF-signal processing circuit 41 reaches its peak value.

To provide proper exposure, moreover, the control circuit 37 controls the drive operation of the iris motor 35, using the mean value of the output of Y signals passed through the AE gate 39 as a reference value, such that the output of the iris encoder 709 matches the reference value, thereby controlling the amount of light.

Furthermore, the control circuit 37 controls the application of current to each coil 308, based on the output from the pitch-direction vibration sensor 51 and the yaw-direction vibration sensor 52 and on signals from the MR sensor 404, thereby driving the third lens unit L3 for image-blur compensation.

As described above, in the present embodiment, the third-a lens subunit L3a and the third-b lens subunit L3b disposed in front of and behind the light-quantity-adjusting unit 7 are driven, in an orthogonal-to-optical-axis direction, to execute image-blue compensation.

In other words, the third-a lens subunit L3a that is conventionally disposed behind the light-quantity-adjusting unit 7 is switched with the light-quantity-adjusting unit 7, in the present embodiment. In this case, when the second lens unit L2 capable of zooming in and out is moved to the back end of the range of movement, the second lens unit L2 and the third-a lens subunit L3a can be brought closer together than they conventionally are. Zoom efficiency (that is, the amount of zoom ratio with respect to the travel distance of the second lens unit L2) can thus be improved without increasing the total length of the zoom-lens optical system. The optical apparatus that is compact but has high zoom efficiency can thus be achieved.

In the present embodiment, a moving-magnet-type actuator is used to drive the third lens unit L3. The present invention can also be applied to the case in which a moving-coil-type actuator, which includes a coil at the third lens unit L3 side and a magnet at the shift base 312 side, is used to drive the third lens unit L3.

Moreover, in the present embodiment, the third-a lens subunit L3a and the third-b lens subunit L3b are driven in an integrated fashion along an orthogonal-to-optical-axis direction. The present invention can also be applied to the case in which the third-a lens subunit L3a and the third-b lens subunit L3b are driven separately (independently). In this case, a different drive actuator is provided for each of the third-a lens subunit L3a and the third-b lens subunit L3b.

Furthermore, while the image-capturing apparatus, which is an integrated combination of the lens barrel and the camera body, has been described in the present embodiment, the present invention can also be applied to removable and interchangeable lens systems, and to optical apparatuses, such as viewing apparatuses including binoculars having an antivibration function.

The present invention not only contributes to the downsizing of an optical apparatus that includes a blur-compensating optical system, but also improves the zoom efficiency in a zoom lens system.

As many apparently widely different embodiments of the present invention can be made without departing from the spirit and scope thereof, it is to be understood that the invention is not limited to the specific embodiments thereof except as defined in the claims.

This application claims priority from Japanese Patent Application No. 2004-103225 filed Mar. 31, 2004, which is hereby incorporated by reference herein.

What is claimed is:

1. An optical apparatus comprising:
    a light-quantity-adjusting unit;
    a first lens unit disposed closer to an object than the light-quantity-adjusting unit;
    a second lens unit disposed closer to an image plane than the light-quantity-adjusting unit;
    a holding member holding the first lens unit and the second lens unit;
    a drive unit driving the holding member in an orthogonal-to-an-optical-axis direction;
    a base member movably supporting the holding member in an orthogonal-to-the-optical-axis direction; and
    the holding member including:
        a first holder holding the first lens unit;
        a second holder holding the second lens unit;
        a connector connecting the first holder and the second holder along an orthogonal-to-the-optical-axis direction;
        the light-quantity-adjusting unit being inserted and disposed into a space defined by the first holder, the second holder, and the connector, from an orthogonal-to-the-optical-axis direction; and
        the light-quantity-adjusting unit being fixed to the base member.

* * * * *